(12) United States Patent
Ansems et al.

(10) Patent No.: US 10,309,585 B2
(45) Date of Patent: Jun. 4, 2019

(54) LIGHT EMITTING DEVICE

(71) Applicant: SIGNIFY HOLDING B.V., Eindhoven (NL)

(72) Inventors: Johannes Petrus Maria Ansems, Eindhoven (NL); Peter Johannes Martinus Bukkems, Eindhoven (NL); Abraham Vamattathil Scaria, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 14/907,584

(22) PCT Filed: Aug. 6, 2014

(86) PCT No.: PCT/EP2014/066872
§ 371 (c)(1),
(2) Date: Jan. 26, 2016

(87) PCT Pub. No.: WO2015/018852
PCT Pub. Date: Feb. 12, 2015

(65) Prior Publication Data
US 2016/0178139 A1   Jun. 23, 2016

(30) Foreign Application Priority Data

Aug. 6, 2013   (EP) ................................. 13179438

(51) Int. Cl.
*F21K 9/61*        (2016.01)
*F21V 3/06*        (2018.01)
(Continued)

(52) U.S. Cl.
CPC ................ *F21K 9/232* (2016.08); *F21K 9/61* (2016.08); *G02B 6/0045* (2013.01);
(Continued)

(58) Field of Classification Search
CPC ......... F21K 9/61; F21K 9/232; G02B 6/0076; F21V 2200/20
See application file for complete search history.

(56) References Cited

U.S. PATENT DOCUMENTS 6,272,265 B1 *   8/2001   Franklin .................. F21S 11/00
                                                                  362/551
6,308,444 B1 *   10/2001   Ki ........................... G09F 13/18
                                                                  362/293
(Continued)

FOREIGN PATENT DOCUMENTS

CN   201779598 U   3/2011
CN   202203686 U   4/2012
(Continued)

*Primary Examiner* — Alexander K Garlen
*Assistant Examiner* — Colin J Cattanach
(74) *Attorney, Agent, or Firm* — Akarsh P. Belagodu

(57) ABSTRACT

A light emitting device (1) comprising at least one light source (2), and a light guide unit comprising at least a first light guide (3) and a second light guide (4) each comprising a light input end surface (6, 31, 41) arranged to, when in operation, receive light emitted from the at least one light source and a light output surface (7, 32, 42), at least a part (8) of the first light guide and the second light guide near the light output end surface being bent in a bending radius (R), at least the first light guide of the light guide unit being ring-shaped in cross section, and the first light guide and the second light guide of the light guide unit being arranged in a nested relationship.

13 Claims, 5 Drawing Sheets

(51) Int. Cl.
*F21V 8/00* (2006.01)
*F21K 9/232* (2016.01)
*F21Y 115/10* (2016.01)

(52) U.S. Cl.
CPC ............ *G02B 6/0076* (2013.01); *F21V 3/061* (2018.02); *F21V 3/062* (2018.02); *F21V 2200/40* (2015.01); *F21Y 2115/10* (2016.08); *G02B 6/0075* (2013.01)

(56) References Cited

U.S. PATENT DOCUMENTS

| | | | |
|---|---|---|---|
| 6,533,429 B2* | 3/2003 | Yoneda | G01N 21/8806 362/555 |
| 6,814,479 B2* | 11/2004 | Aynie | B60Q 1/0052 362/511 |
| 7,677,777 B2 | 3/2010 | Woodward et al. | |
| 7,805,867 B2 | 10/2010 | Har | |
| 8,840,275 B2* | 9/2014 | Parker | G02B 6/0035 362/281 |
| 8,905,598 B2* | 12/2014 | Yokota | F21K 9/52 362/235 |
| 9,423,101 B2* | 8/2016 | Holten | F21V 5/00 |
| 10,036,517 B2* | 7/2018 | Johnston | G02B 6/0001 |
| 2002/0057579 A1* | 5/2002 | Ohkodo | B60Q 1/0011 362/554 |
| 2005/0201693 A1* | 9/2005 | Korenaga | G02B 6/1221 385/89 |
| 2010/0002425 A1 | 1/2010 | Tsai et al. | |
| 2010/0073960 A1* | 3/2010 | Yang | A47G 19/2227 362/612 |
| 2010/0157624 A1* | 6/2010 | Liao | G02B 6/0035 362/611 |
| 2010/0213835 A1* | 8/2010 | Mo | F21V 3/0409 313/512 |
| 2011/0227487 A1* | 9/2011 | Nichol | G02B 6/0018 315/158 |
| 2011/0255303 A1* | 10/2011 | Nichol | G02B 6/006 362/606 |
| 2011/0273906 A1* | 11/2011 | Nichol | G02B 6/0076 362/607 |
| 2011/0309735 A1* | 12/2011 | Parker | F21V 3/02 313/46 |
| 2012/0026748 A1 | 2/2012 | Boonekamp et al. | |
| 2012/0182758 A1 | 7/2012 | Nath | |
| 2012/0236530 A1* | 9/2012 | Parker | G02B 6/0058 362/19 |
| 2012/0236590 A1* | 9/2012 | Parker | G02B 6/0035 362/607 |
| 2012/0287674 A1* | 11/2012 | Nichol | G02B 6/0018 362/611 |
| 2013/0003374 A1* | 1/2013 | Chou | F21V 5/04 362/249.02 |
| 2013/0063962 A1* | 3/2013 | Huang | F21K 9/61 362/555 |
| 2013/0128570 A1* | 5/2013 | Jiang | F21V 5/04 362/235 |
| 2013/0155719 A1* | 6/2013 | Brott | F21K 9/61 362/609 |
| 2013/0175557 A1* | 7/2013 | Ray | H01L 33/56 257/88 |
| 2013/0208495 A1* | 8/2013 | Dau | F21V 7/0008 362/551 |
| 2013/0242567 A1* | 9/2013 | Ariyoshi | F21V 5/04 362/311.02 |
| 2013/0335966 A1* | 12/2013 | Yokota | F21K 9/52 362/235 |
| 2014/0049983 A1* | 2/2014 | Nichol | G02B 6/0018 362/610 |
| 2014/0056028 A1* | 2/2014 | Nichol | G02B 6/0028 362/611 |

FOREIGN PATENT DOCUMENTS

| | | | | |
|---|---|---|---|---|
| EP | 1607676 A1 | 12/2005 | | |
| JP | 2003132713 A | 5/2003 | | |
| JP | 2012209237 A | * 10/2012 | ............... | F21K 9/52 |
| WO | 2009099547 A2 | 8/2009 | | |
| WO | WO 2012125801 A2 | * 9/2012 | ........... | G02B 6/0035 |

* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2014/066872, filed on Aug. 6, 2014, which claims the benefit of European Patent Application No. 13179438.0 filed on Aug. 6, 2013. These applications are hereby incorporated by reference herein.

FIELD OF THE INVENTION

The invention relates to a light emitting device comprising at least one light source and a light guide unit comprising at least two light guides.

BACKGROUND OF THE INVENTION

In prior art light emitting devices it is known to use LEDs to facilitate putting light guides close to the light emitting area of the light source of the light emitting device to obtain a high coupling efficiency. For LEDs with primary lenses a side reflector is necessary for obtaining high coupling efficiencies.

With flat emitting sources such as Medium Power LEDs and flat (remote) Phosphor modules it is possible to put light guides very close to the emitting surface with high coupling efficiencies.

Going from a flat PCB with lambertian light sources to a more all around light emission and at the same time moving the emitting surface upwards for a better filament like look and feel it is necessary to bend the light guide. A prior art light emitting device with a light guide unit comprising a light guide with a bent section is described in US 2012/0026748.

However, the maximum possible bending of the light guide without light leakage occurring is restricted. For illustrative purposes, FIG. 1 shows a bent light guide L. Light can be guided from a top to a side emitting plane. The maximum bending, that is the minimum radius R, of the light guide L with no light leakage occurring from the sides is dependent on the thickness d of the light guide. The maximum of the ratio R/d with no light leakage occurring is also dependent on the refractive index of the light guide and its surroundings, which may e.g. be air or alternatively a suitable and preferably transparent cladding.

For light sources which have a relatively large emitting area compared to the total available space in the light emitting device the limitations on the maximum bending is a problem, which may lead to unwanted light leakage occurring through the side surfaces of the light guides of the light emitting device. This in turn results in a compromised light distribution of the light emitting device.

SUMMARY OF THE INVENTION

It is an object of the present invention to overcome this problem, and to provide a light emitting device with which the light guide unit of the light emitting device may cover the total light emitting area of the light sources while still having the possibility of providing the light guide unit with a large bending. The word bending indicates the curvature of the light guide and is inversely proportional to the bending radius of the lightguide.

According to a first aspect of the invention, this and other objects are achieved by means of a light emitting device comprising at least one light source, and a light guide unit comprising at least a first light guide and a second light guide each comprising a light input end surface arranged to, when in operation, receive light emitted from the at least one light source and a light output surface, at least a part of the first light guide and the second light guide near the light output end surface being bent in a bending radius R, at least the first light guide of the light guide unit being ring-shaped in cross section, and the first light guide and the second light guide of the light guide unit being arranged in a nested relationship.

Thereby a light emitting device is provided with which the light guides may be provided with a larger maximum bending, that is a smaller radius R, as each light guide may be provided with a smaller thickness, particularly half the total thickness of the light guide unit, with no light leakage occurring. Thereby light leakage occurring through the side surfaces of the light guides of the light emitting device may be avoided. This in turn results in a significantly improved light distribution of the light emitting device. Also, the light guides of such a light emitting device may collect light from all of the light emitting area of the light source.

In an embodiment, the first light guide and the second light guide comprise a first surface and a second surface and are arranged such that the first surface of one of the first light guide and the second light guide extend in parallel with and adjacent to the second surface of the other of the first light guide and the second light guide.

In a further embodiment the first surface of one of the first light guide and the second light guide is arranged abutting the second surface of the other of the first light guide and the second light guide.

Thereby a light emitting device with a particularly simple and durable structure and construction is provided.

In an embodiment the light guide unit further comprises a central cavity around which the first light guide and the second light guide extend. Preferably, in an embodiment, the second light guide of the light guide unit is also ring shaped in cross section Thus, in an embodiment the light guide unit is ring-shaped seen in a cross section extending perpendicular to a center axis of the light guide unit.

Thereby the central cavity consequently extends in the entire height direction of the light guide unit, the height direction being parallel with a center axis or optical axis of the light guide unit. Furthermore, it becomes possible to provide a light guide unit with even large central cavities such as to adapt the light emitting device to ring shaped light sources while simultaneously still providing a significantly improved light distribution.

In an embodiment the light emitting device further comprises at least one further light guide arranged in a nested relationship with the first light guide and the second light guide.

Thereby a light emitting device is provided with which each light guide of the light guide unit may be provided with an even smaller thickness and thereby even larger bending without light leakage occurring and/or with which light from an even larger light emitting surface area of the light source may be collected by coupling into the light guides.

Preferably, the light guide unit is substantially funnel-shaped.

In an embodiment the light guide unit is substantially funnel-shaped seen in a cross section extending in parallel with a center axis of the light guide unit.

In an embodiment the light guide unit further comprises two light output end surfaces.

Thereby a light emitting device is provided with which light may be emitted from the light guides of the light guide unit in two directions simultaneously. Such a light emitting device has the advantage that it may be made rotation symmetric or that it may be made to look like an incandescent filament, thereby providing it with an appearance being particularly pleasant to a viewer.

In an embodiment the light output end surface of the light guide unit is wave-shaped.

This provides for a light emitting device with a more filament-like look. Furthermore a wave-shaped light output end surface provides for an additional parameter for tuning and adapting the light distribution of the device, in that the amplitude and/or frequency of the wave-shape may be altered.

In an embodiment the light output end of the light guide unit is provided with a plurality of prism structures.

Thereby a light emitting device is provided having an enhanced sparkle effect, i.e. a light distribution changing with the viewing angle of a user looking at the light emitting device. It is noted that such a sparkle effect may also be obtained by means of e.g. a phosphor.

Preferred light sources for use in a light emitting device according to the invention include, but are not limited to, a lambertian light source, particularly a flat lambertian light source, an LED, a plurality of LEDs or a remote phosphor light source or combinations thereof. The light sources may be mounted on a printed circuit board (PCB).

According to a second aspect of the invention, the above and other objects are achieved by means of a lamp, like e.g. a light bulb comprising a base and a light emitting device according to the invention arranged on the base.

Preferably, the lamp further comprises an outer cover or outer bulb covering the light emitting device.

These types of lamps are in particular suited for replacing the well-known incandescent type of lamps.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

It is noted that like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
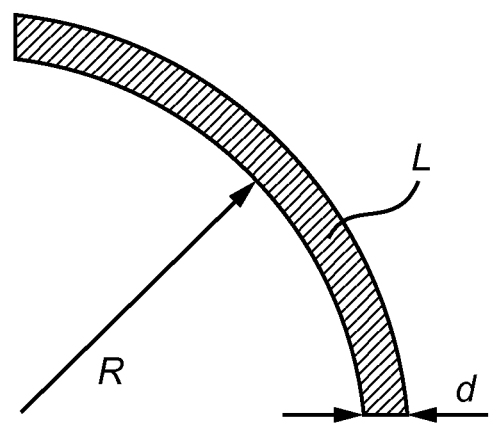
FIG. 1 shows a principle sketch of a bent light guide illustrating the bending radius R and the thickness d of the light guide.
Figure 2:
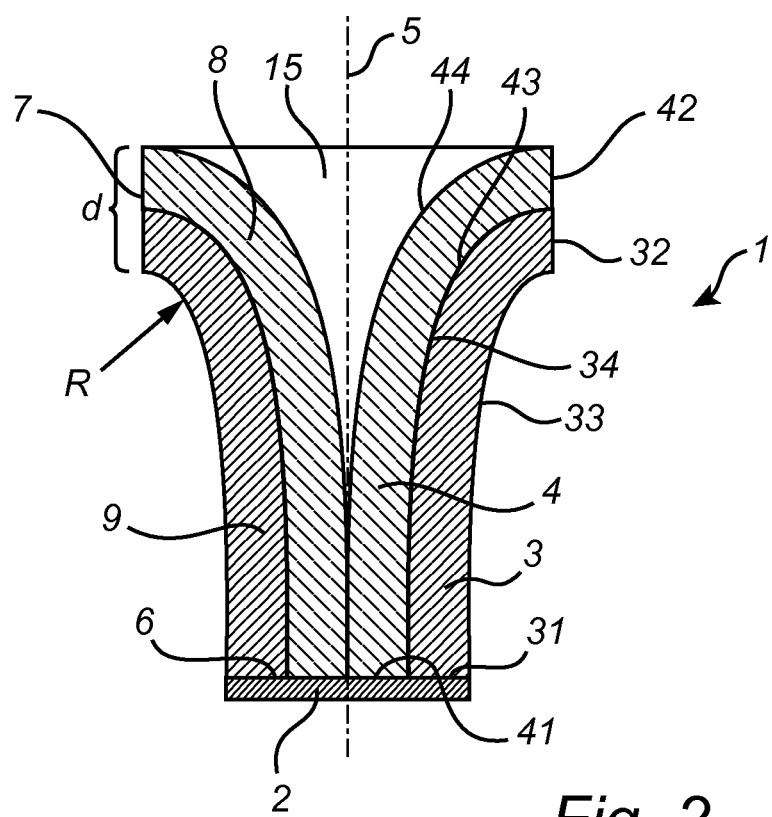
FIG. 2 shows a cross sectional view of a first embodiment of a light emitting device according to the invention comprising two nested light guides.

FIG. 2 shows a light emitting device 1 according to the invention. The light emitting device 1 comprises a light source 2 and a light guide unit comprising a first light guide 3 and a second light guide 4.

Generally, the light guide unit comprises a light input end surface 6 and an opposite light output end surface 7. Light emitted from the light source 2 is coupled into the light guide unit at the light input end surface 6, travels through the light guide unit and is emitted from the light guide unit at the light output end surface 7.

Generally, the first light guide 3 and the second light guide 4 of the light guide unit are arranged in a nested relationship. By a "nested relationship" is to be understood that the first light guide 3 and the second light guide 4 are arranged one inside the other, but not necessarily contacting each other. In other words, the second light guide 4 is made to fit inside the first light guide 3 as shown on FIG. 2, or for that matter vice versa. The same applies, mutatis mutandis, for embodiments in which the light guide unit comprises more than two light guides.

Hence, and more specifically, the first light guide 3 and the second light guide 4 each comprise a light input end surface 31, 41 and a light output end surface 32, 42. Light emitted from the light source 2 is coupled into the respective light guide 3, 4 at the respective light input end surface 31, 41, travels through the respective light guide 3, 4 and is emitted from the respective light guide 3, 4 at the respective light output end surface 32, 42.

It is noted that some light leakage from the sides of the light guide may in practice occur. If this is the case, the total light distribution may also be tuned by controlling the allowed leakage.

Furthermore, a first part 8 of the first light guide 3 and the second light guide 4 near the light output end surface 32, 42 is bent in a bending radius R, while a second part 9 of the first light guide 3 and the second light guide 4 near the light input end surface 31, 41, and thus opposite the first part 8, is substantially straight. Thereby a substantially funnel-shaped light guide unit is provided.

It is noted that in alternative embodiments the substantially straight part 9 of the light guides 3, 4 may be omitted and/or the light guides may be provided with different parts having different bending radii.

In any event, the first light guide 3 and the second light guide 4 each comprise a first surface 33, 43 and a second surface 34, 44. The first light guide 3 and the second light guide 4 are arranged such that the first surface 43 of the second light guide 4 extend in parallel with and abutting the second surface 34 of the first light guide 3.

Alternatively, the first light guide 3 and the second light guide 4 are arranged such that the first surface 33 of the first light guide 3 extend in parallel with and abutting the second surface 44 of the first second guide 3.

In another alternative, the first light guide 3 and the second light guide 4 may be arranged such that the first surface 43 of the second light guide 4 extend in parallel with and adjacent to the second surface 34 of the first light guide 3 in the sense that the light guides 3 and 4 may be attached to each other by means of an adhesive or another suitable material, which preferably do influence the light intensity adversely, and/or that the light guides 3, and 4 may each be encased in a preferably transparent cladding.

Thus likewise, the first light guide 3 and the second light guide 4 may alternatively be arranged such that the first surface 33 of the first light guide 3 extend in parallel with and adjacent to the second surface 44 of the first second guide 4.

Figure 3:
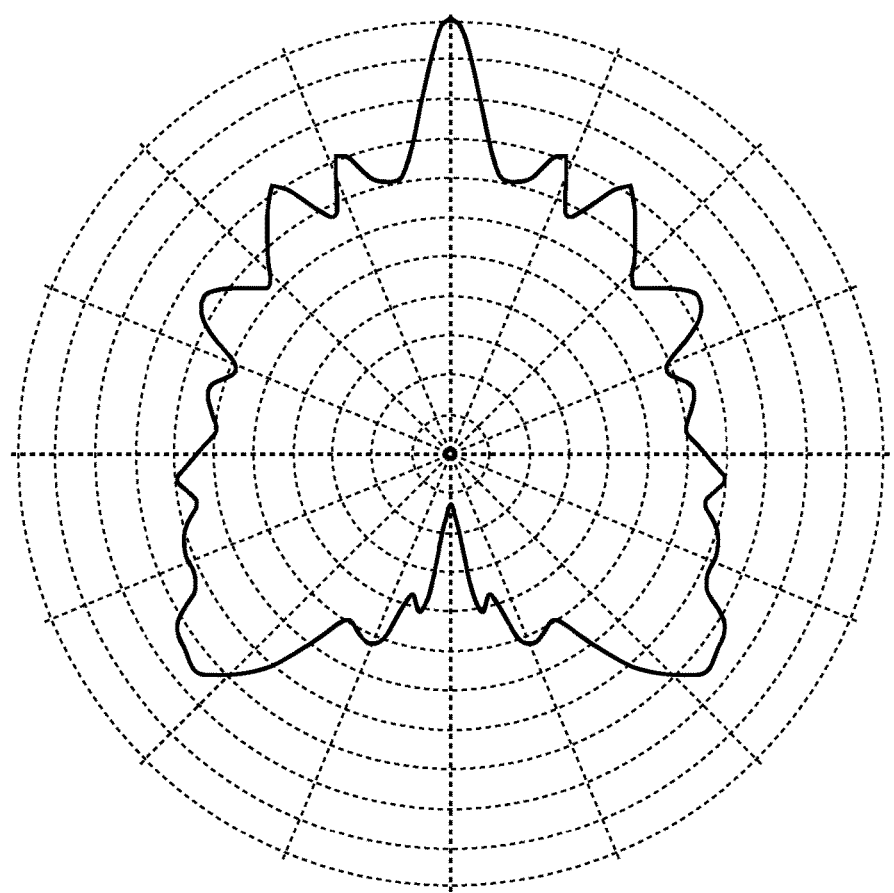
FIG. 3 shows the light distribution of a light emitting device according to FIG. 1.

As illustrated on FIG. 2 the first light guide 3 and the second light guide 4 each has a thickness d/2 such that they have a combined thickness d. In this way, compared to one light guide with a thickness d, the ratio governing the maximum possible bending of each of the light guides 3, 4 becomes R/(d/2) or 2*R/d. In other words it becomes possible to provide each light guide 3, 4 with twice the previously possible maximum bending without or with considerably less light leaking from the light guides. FIG. 3 illustrates the resulting light distribution as a function of viewing angle.

Obviously it is possible to provide a light emitting device according to the invention having a light guide unit with more than two such light guides, e.g. having three, four or five light guides.

Put in alternative words, the first light guide 3 and the second light guide 4, as well as any further light guide where present, of the light guide unit are thus arranged in a nested relationship.

Furthermore, the first light guide 3 and the second light guide 4 of the light guide unit are ring-shaped in cross section extending around a center axis 5 of the light guide unit such that the light guide unit is provided with a central cavity 15 or opening.

In FIG. 2 the central cavity 15 is shown extending through only a part of the light guide unit in the height direction thereof, the height direction extending in parallel with the center axis 5. In other embodiments, such as the one shown in FIG. 6, the central cavity 15 may however be extending through the whole light guide unit in the height direction thereof.

Obviously, alternative embodiments in which the ring shape is interrupted at one or more places and/or with no central cavity or opening are likewise feasible.

The light source 2 shown in FIG. 2 is a flat light source, such as a flat remote phosphor light source.

Another alternative is a flat PCB with LEDs, preferably Lambertian LEDs, although smaller or wider angle emitting LEDs are also suitable. A Lambertian LED is an optical source that obeys Lambert's cosine law, $$I = I_0 \cos(\alpha),\qquad \text{Eq. 1}$$

wherein $\alpha$ equals the viewing angle, and $I_0$ the light intensity at $\alpha=0$, i.e. normal to the LEDs. As can be deducted from Eq. 1, the light intensity at a viewing angle close to $\alpha=90$ is very low. Examples of commercially available Lambertian LEDs are the Luxeon Rebel or Luxeon K2 LEDs. An alternative is flat Mid-power LEDs, such as LUXEON 3535.

It should be noticed that other types and numbers of light sources may be used in the light emitting device according to the invention and are considered to fall within the scope of the present inventive concept. Furthermore, different colors of the light sources and/or combinations of colors of the light sources may be used in the light emitting device according to the invention.

Suitable materials for the light guides may be transparent polymers, like e.g. polycarbonate (PC), polymetylmethacrylate (PMMA), polyethylene terephthalate (PET), acrylics, glass or any combination thereof.

Figure 4:
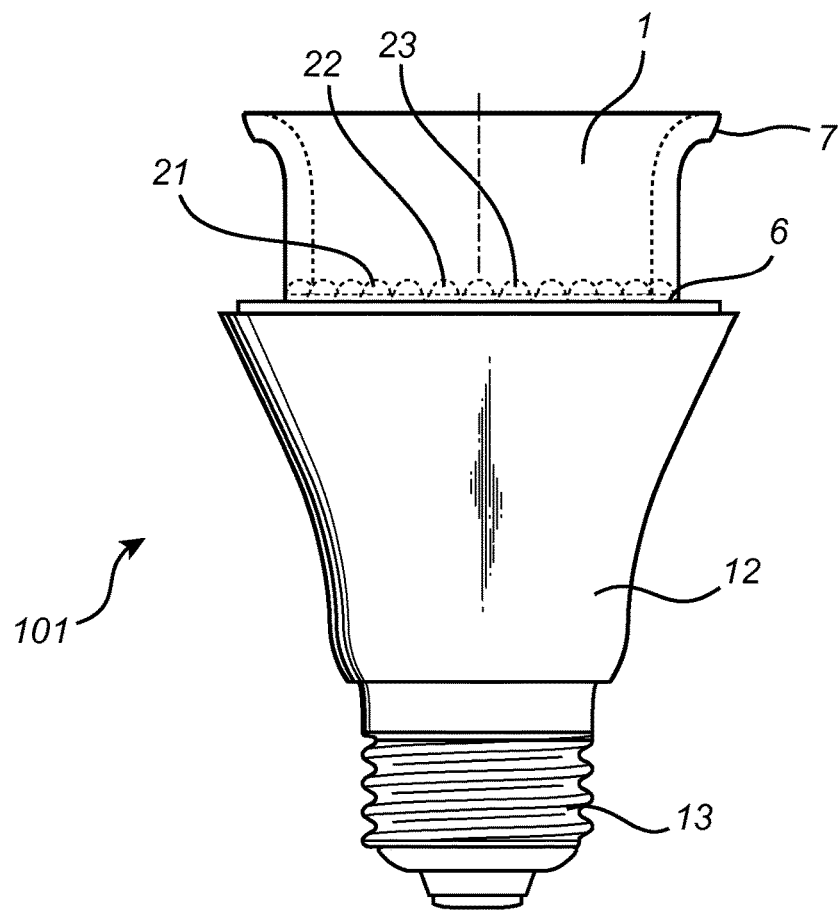
FIG. 4 shows a cross sectional view of a lamp employing a second embodiment of a light emitting device according to the invention.

Turning now to FIG. 4, a lamp 101 employing a second embodiment of a light emitting device 1 according to the invention is shown. The light emitting device 1 is mounted on a base 12 comprising a thread 13 for mounting the lamp 101 in a suitable socket.

As illustrated the light emitting device 1 shown in FIG. 4 comprises as light sources a plurality of LEDs 21, 22, 23 arranged in a ring with a relatively large central opening. Thus, the light guide unit, which is preferably rotational symmetric and has an overall tube-like shape with an outwardly bent part near the light output end surface 7, is likewise ring shaped in cross section with an equally large central opening.

Furthermore, the lamp 101 may be a light bulb comprising an outer cover or outer bulb (not shown), which is preferably made of a glass but may also be made of PC or PMMA or PUR or PET, and which may be diffuse or clear.

Figure 7:
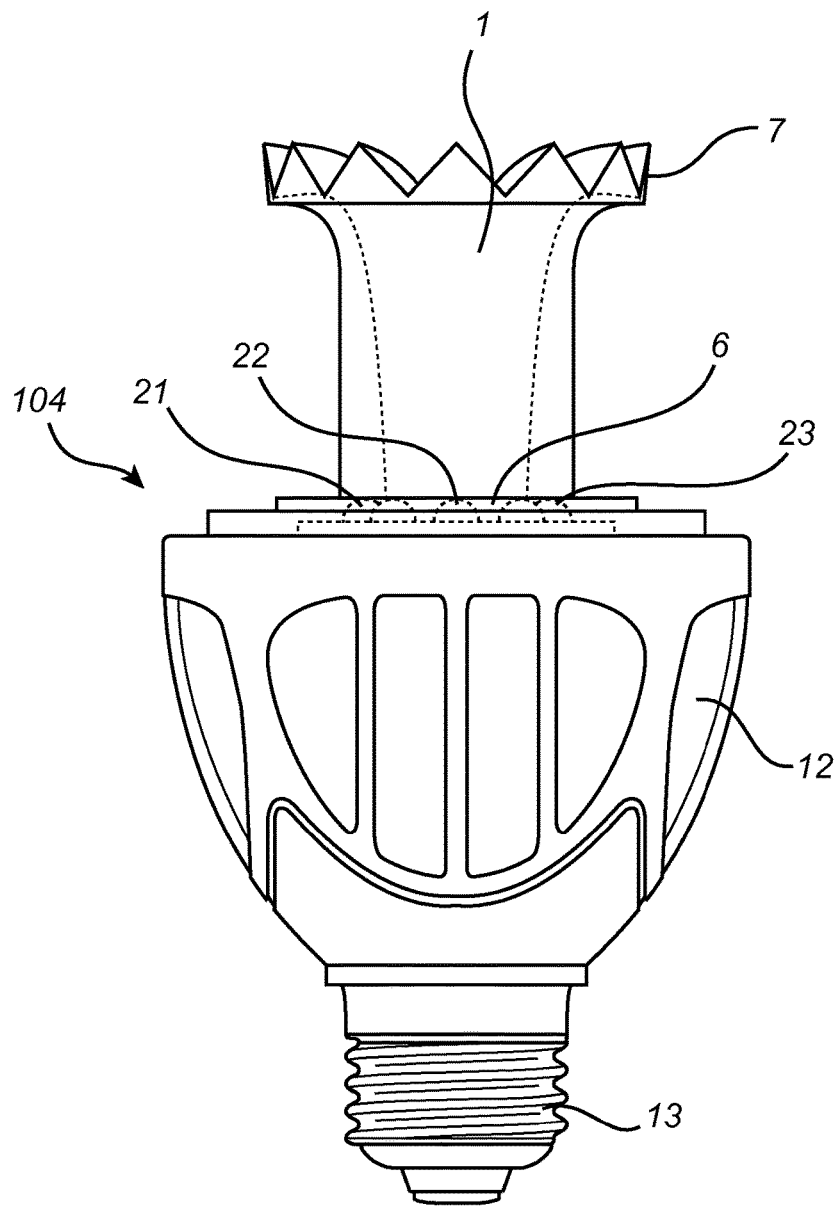
FIG. 7 shows a cross sectional view of a lamp, particularly a candle shaped bulb, employing a fifth embodiment of a light emitting device according to the invention.

However, when the light emitting end surface 7 of the light guide unit becomes large in diameter it may interfere with the outline of the lamp or, when close to the outer bulb, will give an unwanted luminance distribution at the outer bulb or cover. In particular for diffuse outer bulbs or covers this may be an adverse and unwanted effect due to possible luminance gradients. Therefore, in an alternative embodiment shown in FIG. 7, the lamp 104 is provided with a light guide unit 1, which is provided with an overall conical shape of which the central opening has its smallest diameter at the side of the light input surface 6 and which diameter increases before curving outwards near the light output end surface 7.

The angle of the light guide unit with the normal of the lambertian emitting plane, however, is limited due to the limited difference in refractive index between the light guides of the light guide unit and the surroundings. Therefore in a further alternative embodiment (not shown) the light guide unit is shaped such that it, starting at the light input end surface, starts as a substantially cylindrical tube, then narrows to a smaller diameter, and finally near the light output end surface is provided with the final bend to realize the light emitting side with a larger diameter.

Figure 5:
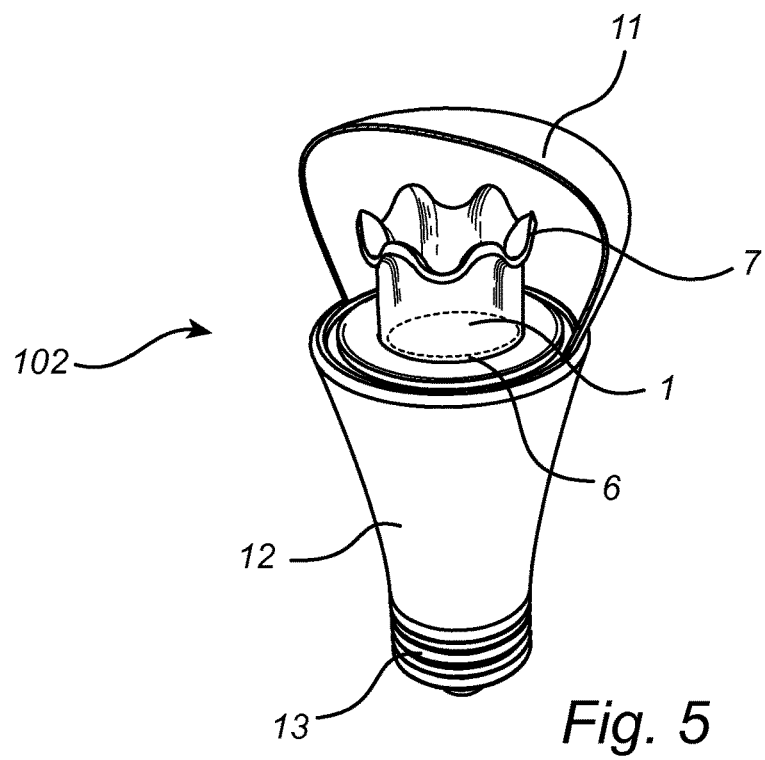
FIG. 5 shows a cross sectional view of a lamp employing a third embodiment of a light emitting device according to the invention.

With reference now to FIG. 5, a light bulb 102 employing a third embodiment of a light emitting device 1 according to the invention is shown. The light emitting device 1 is mounted on a base 12 comprising a thread 13 for mounting the lamp 102 in a suitable socket. Furthermore, the lamp 102 comprises an outer cover or outer bulb 11, which is preferably made of a glass (but also plastic is possible), and which may be diffuse or clear.

In this embodiment, the light emitting device 1 is provided with a more filament-like look, as the light output end surface 7, and optionally also the part of the light guide unit adjacent thereto, of the light guide unit is provided with a wave shape. By changing the amplitude and frequency of such a wave shape the light distribution can also be tuned.

Furthermore, although not shown on FIG. 5, small prism structures may be provided at the light output end surface 7 of the light guide unit such as to provide for an enhanced sparkle effect. In an alternative such a sparkle effect may be obtained by providing a phosphor in lieu of the prism structures. Obviously small prism structures, a phosphor or the like may be provided at the light output end surface of the light guide in any embodiment of a light emitting device according to the invention.

Figure 6:
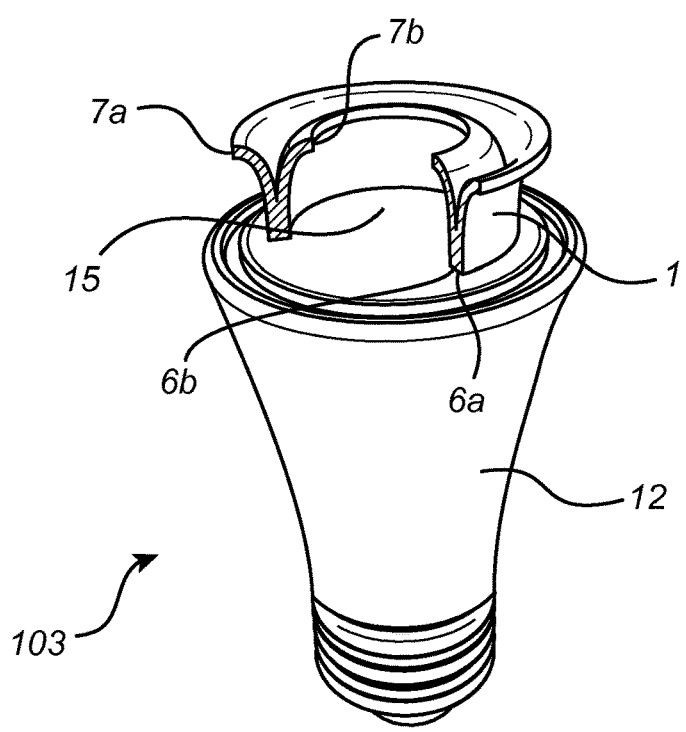
FIG. 6 shows a cross sectional view of a lamp employing a fourth embodiment of a light emitting device according to the invention.

Finally, FIG. 6 shows a lamp 103 employing a fourth embodiment of a light emitting device 1 according to the invention. The light emitting device 1 is mounted on a base 12, which may comprise a thread (not shown) for mounting the lamp 103 in a suitable socket. Furthermore, the lamp 103 comprises an outer cover or outer bulb (not shown), which is preferably made of a glass, and which may be diffuse or clear.

In this embodiment the light guide unit is funnel-shaped in cross section and is two-sided, i.e. it is provided with two light output end surfaces 7a, 7b, and therefore likewise with two light input end surfaces 6a, 6b. Alternatively, the light guide unit may comprise only one light input end surface, and the light guide(s) of the light guide unit may then be bifurcated to provide two light output end surfaces. That is, the light input end surfaces 6a, 6b of the two light guides are merged into one light input end surface.

In this embodiment it becomes possible to employ a thicker light guide, which in turn provides for that more LEDs may be mounted below the light guide. Furthermore, with such a light guide unit it is still possible to make it rotational symmetric, but is also possible to mimic an incandescent filament, which has a not totally rotational symmetric appearance, with no light leakage from the side surfaces. Also, it is possible to provide the light output end surface of this type of light guide unit with a wave shape similar to that described in relation to FIG. 5 above.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
   at least one light source, and
   a light guide unit comprising at least a first light guide and a second light guide each comprising a light input end surface arranged to receive light emitted from said at least one light source, and a light output end surface arranged opposite said light input end surface, said first light guide and said second light guide of said light guide unit being arranged in a nested relationship,
   at least a first part of said first light guide and said second light guide having a thickness and being bent in a bending radius R in between the light input end surface and the light output end surface near said light output end surface, such that said first light guide and said second light guide both bend away from the center axis of the light guide unit in a plane parallel to the center axis;
   at least a second part of the light guide unit being substantially straight and extending from the light input end in a direction substantially parallel to the center axis of the light guide unit,
   at least said first light guide of said light guide unit being ring-shaped in cross section,
   wherein a sum of the thicknesses of the first and second light guides at the first part is approximately equal to a combined thickness of the light guide unit at the second part, wherein the thickness of the first light guide and the second light guide is selected with respect to bending radius R to substantially avoid light leakage through a side surface of the first light guide and a side surface of the second light guide.

2. A light emitting device according to claim 1, wherein said first light guide and said second light guide comprise a first surface and a second surface and are arranged such that the first surface of one of the first light guide and the second light guide extend in parallel with and adjacent to the second surface of the other of the first light guide and the second light guide.

3. A light emitting device according to claim 2, wherein the first surface of one of the first light guide and the second light guide is arranged abutting the second surface of the other of the first light guide and the second light guide.

4. A light emitting device according to claim 1, wherein said second light guide of said light guide unit is ring-shaped in cross section.

5. A light emitting device according to claim 1, wherein said light guide unit further comprises a central cavity around which said first light guide and said second light guide extend.

6. A light emitting device according to claim 1, wherein said light guide unit is ring-shaped seen in a cross section extending perpendicular to said center axis of said light guide unit.

7. A light emitting device according to claim 1, wherein said light guide unit is substantially funnel-shaped.

8. A light emitting device according to claim 1, wherein said light guide unit is substantially funnel-shaped seen in a cross section extending in parallel with said center axis of said light guide unit.

9. A light emitting device according to claim 1, wherein said light output end surface of said light guide unit is wave-shaped.

10. A light emitting device according to claim 1, wherein said light output end of said light guide unit is provided with a plurality of prism structures.

11. A light emitting device according to claim 1, wherein said at least one light source is a lambertian light source.

12. A light emitting device according to claim 1, wherein said at least one light source is an LED, a plurality of LEDs or a remote phosphor light source.

13. A lamp comprising an outer cover, a base and a light emitting device according to claim 1 arranged on said base and covered by said cover.

* * * * *